United States Patent
Miyamoto et al.

(10) Patent No.: US 10,721,724 B2
(45) Date of Patent: Jul. 21, 2020

(54) WIRELESS COMMUNICATION SYSTEM AND COMMUNICATION METHOD

(71) Applicant: NIPPON TELEGRAPH AND TELEPHONE CORPORATION, Tokyo (JP)

(72) Inventors: Kenji Miyamoto, Yokosuka (JP); Jun Terada, Yokosuka (JP); Shigeru Kuwano, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/085,444

(22) PCT Filed: Apr. 4, 2017

(86) PCT No.: PCT/JP2017/014075
§ 371 (c)(1),
(2) Date: Sep. 14, 2018

(87) PCT Pub. No.: WO2017/175758
PCT Pub. Date: Oct. 12, 2017

(65) Prior Publication Data
US 2019/0069278 A1 Feb. 28, 2019

(30) Foreign Application Priority Data

Apr. 6, 2016 (JP) .................................. 2016-076553

(51) Int. Cl.
*H04W 72/04* (2009.01)
*H04W 16/02* (2009.01)
(Continued)

(52) U.S. Cl.
CPC ......... *H04W 72/042* (2013.01); *H04W 16/02* (2013.01); *H04W 88/08* (2013.01); *H04W 92/16* (2013.01); *H04W 80/02* (2013.01)

(58) Field of Classification Search
None
See application file for complete search history.

(56) References Cited

U.S. PATENT DOCUMENTS 6,058,317 A * 5/2000 Posti ................... H04W 88/085
455/561
6,281,925 B1 * 8/2001 Kosaka ............. H04M 1/72519
348/14.01
(Continued)

FOREIGN PATENT DOCUMENTS

EP 2785138 A1 10/2014
JP 2014-086994 A 5/2014
(Continued)

OTHER PUBLICATIONS

InterDigital Communications, "Fronthauling with New Radio Technology", 3GPP Draft; R2-162826 (REL-14 NR SI-AI951 NR Fronthauling), 3rd Generation Parntership Project (3GPP), Mobile Competence Centre; 650, Route Des Lucioles; F-06921 Sophia-Antipolis Cedex; France, vol. RAN WG2, no. Dubrovnik, Croatia; Apr. 11, 2016-Apr. 15, 2016, Apr. 2, 2016.
(Continued)

*Primary Examiner* — Eunsook Choi
(74) *Attorney, Agent, or Firm* — Harness, Dickey & Pierce, P.L.C.

(57) ABSTRACT

A wireless communication system includes a control device and at least one communication device. The control device includes a scheduler configured to generate control information for a process of a physical layer in wireless communication between the communication device and a terminal, an encoding unit configured to generate encoded data
(Continued)

by performing encoding on data to be transmitted to the terminal on the basis of the control information, and a transmission unit configured to transmit the control information to the communication device when the control information is generated and transmits the encoded data to the communication device when the encoded data is generated. The communication device includes a reception unit configured to the control information and the encoded data from the control device; and a signal processing unit configured to perform signal processing for transmitting the encoded data received by the reception unit to the terminal on the basis of the control information received by the reception unit.

5 Claims, 9 Drawing Sheets

(51) Int. Cl.
*H04W 92/16* (2009.01)
*H04W 88/08* (2009.01)
*H04W 80/02* (2009.01)

(56) References Cited

U.S. PATENT DOCUMENTS

| | | | |
|---|---|---|---|
| 8,705,483 B2* | 4/2014 | Liu | H04L 5/0023 370/329 |
| 10,334,452 B2* | 6/2019 | Lee | H04W 24/02 |
| 2004/0105406 A1* | 6/2004 | Kayama | H04L 1/1607 370/322 |
| 2005/0164656 A1* | 7/2005 | Watabe | H03F 1/3247 455/114.3 |
| 2018/0234875 A1* | 8/2018 | Leroudier | H04W 88/085 |
| 2018/0367196 A1* | 12/2018 | Nammi | H04B 7/0473 |

FOREIGN PATENT DOCUMENTS

| | | |
|---|---|---|
| JP | 2015-142189 A | 8/2015 |
| WO | WO-2015044871 A1 | 4/2015 |

OTHER PUBLICATIONS

Extended European Search Report regarding EPSN 177791365, dated Jul. 8, 2019.

Yasuhiko Matsunaga, Radio Access Network Architecture Evolution toward 5G, IEICE Technical Report, vol. 114, No. 254, RCS2014-172, pp. 89-94, Oct. 2014, with partial translation attached.

Kenji Miyamoto et al., Proposal on Functional-Split Scheme of Base Stations for Future Radio Access, IEICE Technical Report, vol. 115, No. 123, CS2015-15, pp. 33-38, Jul. 2015, with partial translation attached.√.

International Search Report for PCT/JP2017/014075, ISA/JP, dated Jun. 13, 2017, with English translation attached.

* cited by examiner

WIRELESS COMMUNICATION SYSTEM AND COMMUNICATION METHOD

CROSS-REFERENCE TO RELATED APPLICATIONS

This application is a 371 U.S. National Stage of International Application No. PCT/JP2017/014075, filed Apr. 4, 2017, which claims priority to Japanese Patent Application No. 2016-076553, filed Apr. 6, 2016. The entire disclosures of both of the above applications are incorporated herein by reference.

TECHNICAL FIELD

The present invention relates to a wireless communication system and a communication method.

BACKGROUND ART

In a wireless communication system, particularly, in a mobile communication system, it has been studied to use a configuration called a centralized/cloud radio access network (C-RAN) in order to increase flexibility of base station deployment. In a C-RAN, functions of a base station are divided in two, and the functions are assigned to two devices called base band unit (BBU) and a remote radio head (RRH). The BBU and the RRH are connected by an optical fiber. However, in the C-RAN in which functions of a physical layer (PHY) including a baseband signal processing function are aggregated in the BBU and IQ data of radio signals are transmitted to the RRH, a very large bandwidth is necessary for an optical link between the BBU and the RRH called a mobile front haul (MFH). Therefore, it has been studied to reduce the bandwidth required for the MFH through redefining of functions to be assigned to the BBU and the RRH of the C-RAN.

Figure 5:
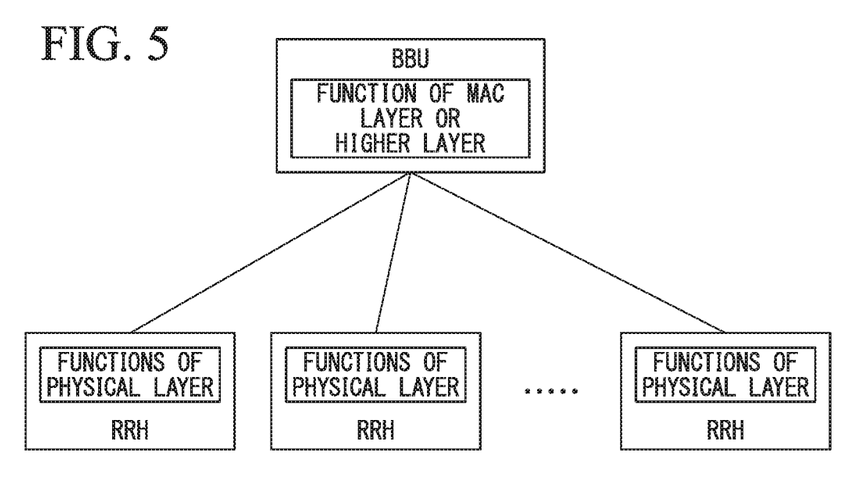
FIG. 5 shows a function division scheme called MAC-PHY Split of the related art.
Figure 6:
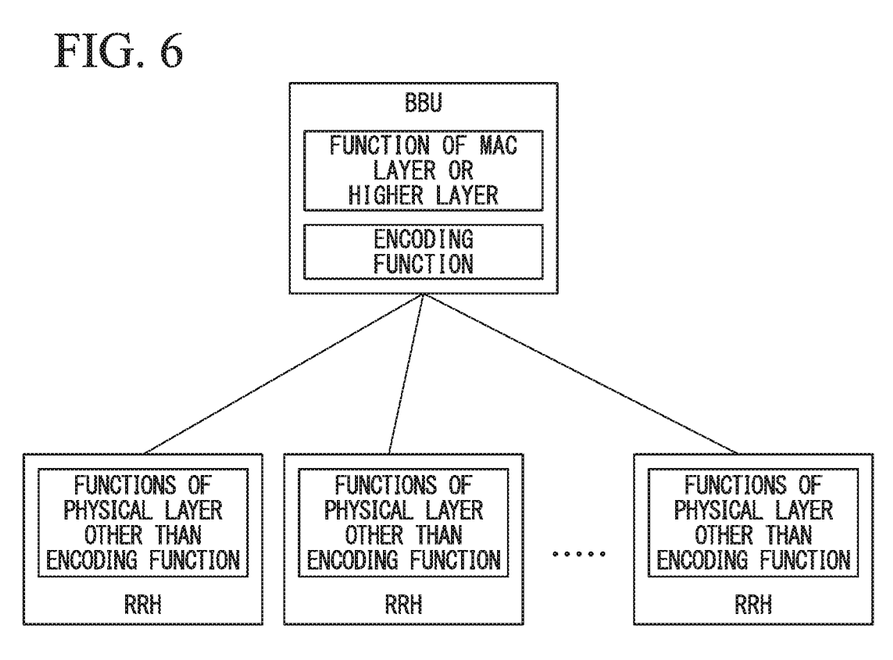
FIG. 6 is a diagram showing a function splitting scheme called SPP of the related art.

FIG. 5 is a diagram showing a function division scheme called MAC-PHY Split. In the MAC-PHY Split scheme, functions of a media access control (MAC) layer or higher layers are assigned to a BBU, and functions of a physical layer are assigned to an RRH (Non-Patent Document 1). FIG. 6 is a diagram showing a functional division scheme called split-PHY processing (SPP). In the SPP scheme, functions of the MAC layer, higher layers, and an encoding function, which is one of physical layer functions, are assigned to the BBU, and the functions of the physical layer other than the encoding function are assigned to the RRH (Non-Patent Document 2).

Figure 7:
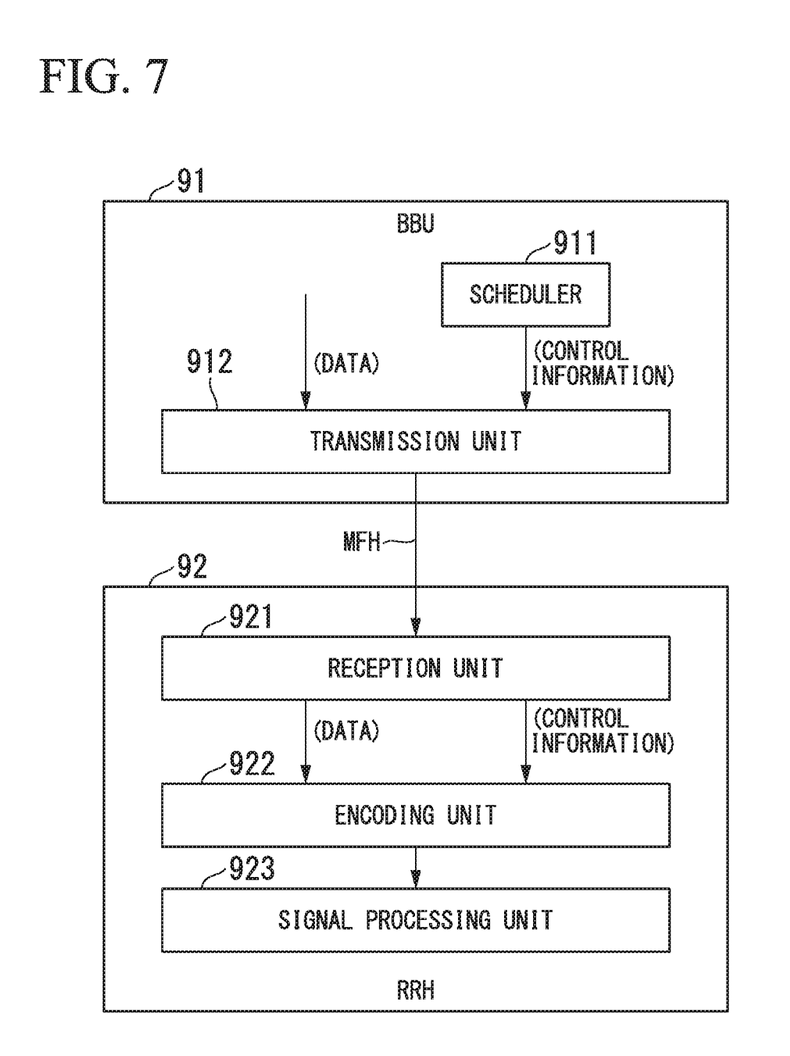
FIG. 7 is a diagram showing downlink signal transmission in the MAC-PHY Split scheme of the related art.
Figure 8:
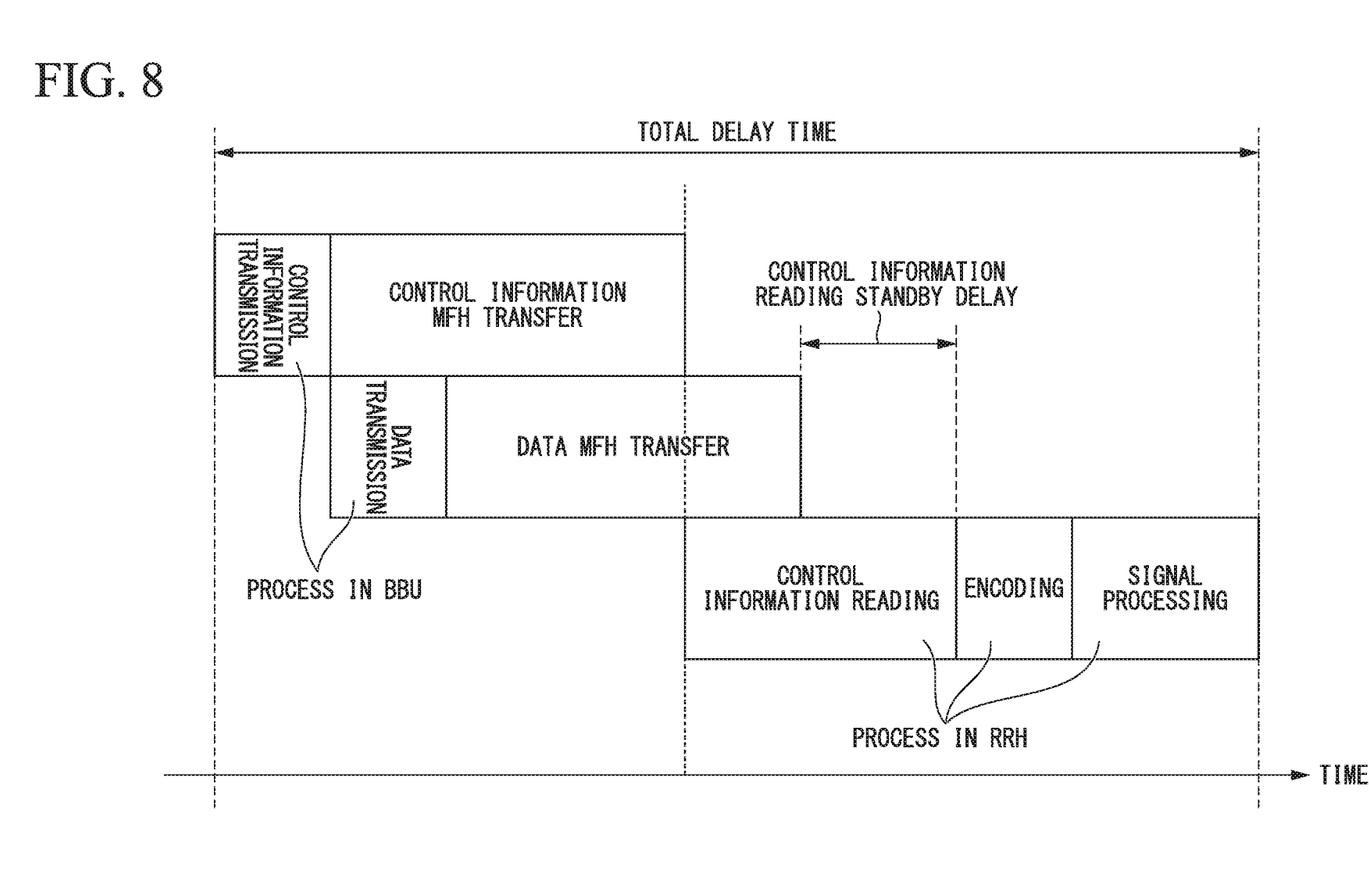
FIG. 8 is a diagram showing a flow of the downlink signal transmission in the MAC-PHY Split scheme of the related art.

In a mobile communication system, a scheduler which is one of the functions of the MAC layer generates control information for the functions of the physical layer. FIGS. 7 and 8 show a downlink signal transmission and a flow in the MAC-PHY Split scheme. FIG. 7 is a diagram showing the downlink signal transmission in the MAC-PHY Split scheme. A BBU 91 includes a scheduler 911 and a transmission unit 912. An RRH 92 includes a reception unit 921, an encoding unit 922 and a signal processing unit 923. FIG. 8 is a diagram showing a flow of the downlink signal transmission in the MAC-PHY Split scheme. In the downlink signal transmission, in the BBU 91, the transmission unit 912 transmits data to be transmitted to the terminal and the control information generated by the scheduler 911 to the RRH 92 via the MFH. In the RRH 92, the reception unit 921 receives the data and the control information. The encoding unit 922 and the signal processing unit 923 included in the functions of the physical layer read the control information received from the reception unit 921 and perform signal processing on the data according to an information included in the control information.

Figure 9:
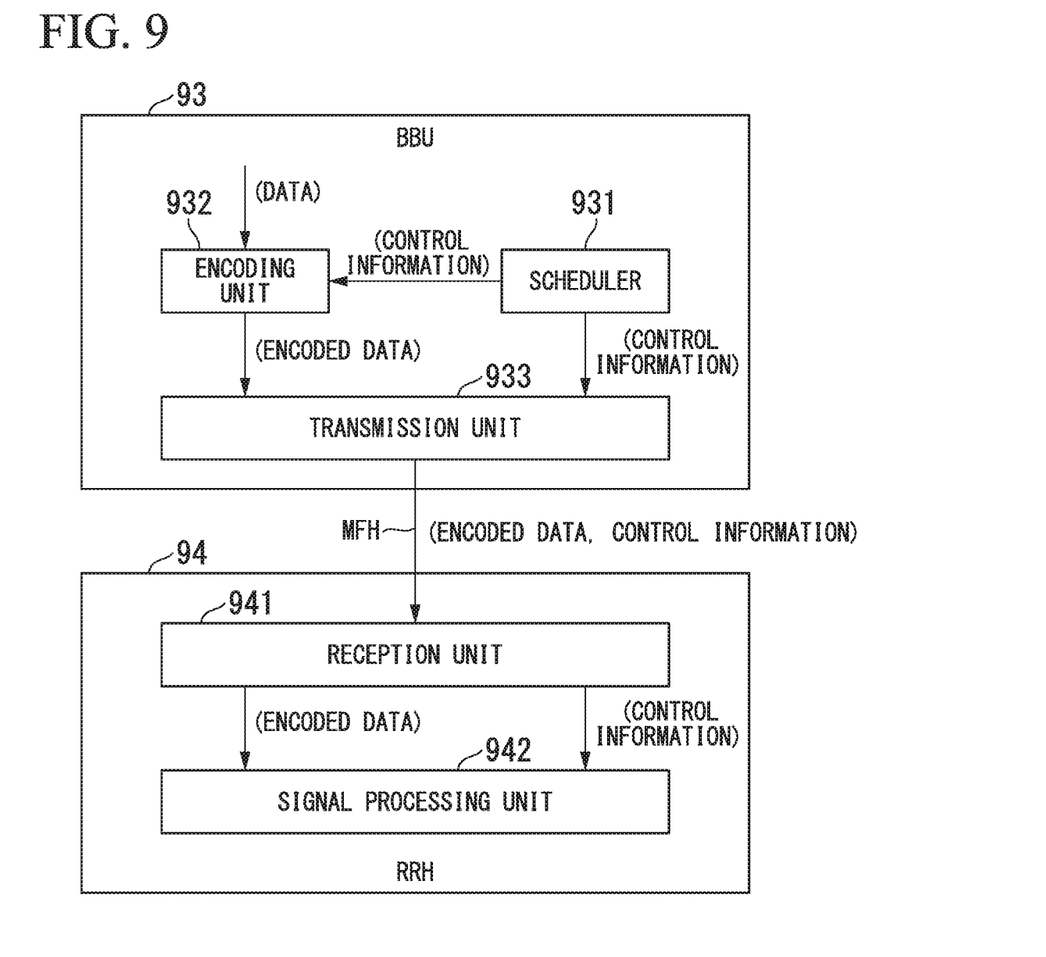
FIG. 9 is a diagram showing downlink signal transmission in an SPP scheme of the related art.
Figure 10:
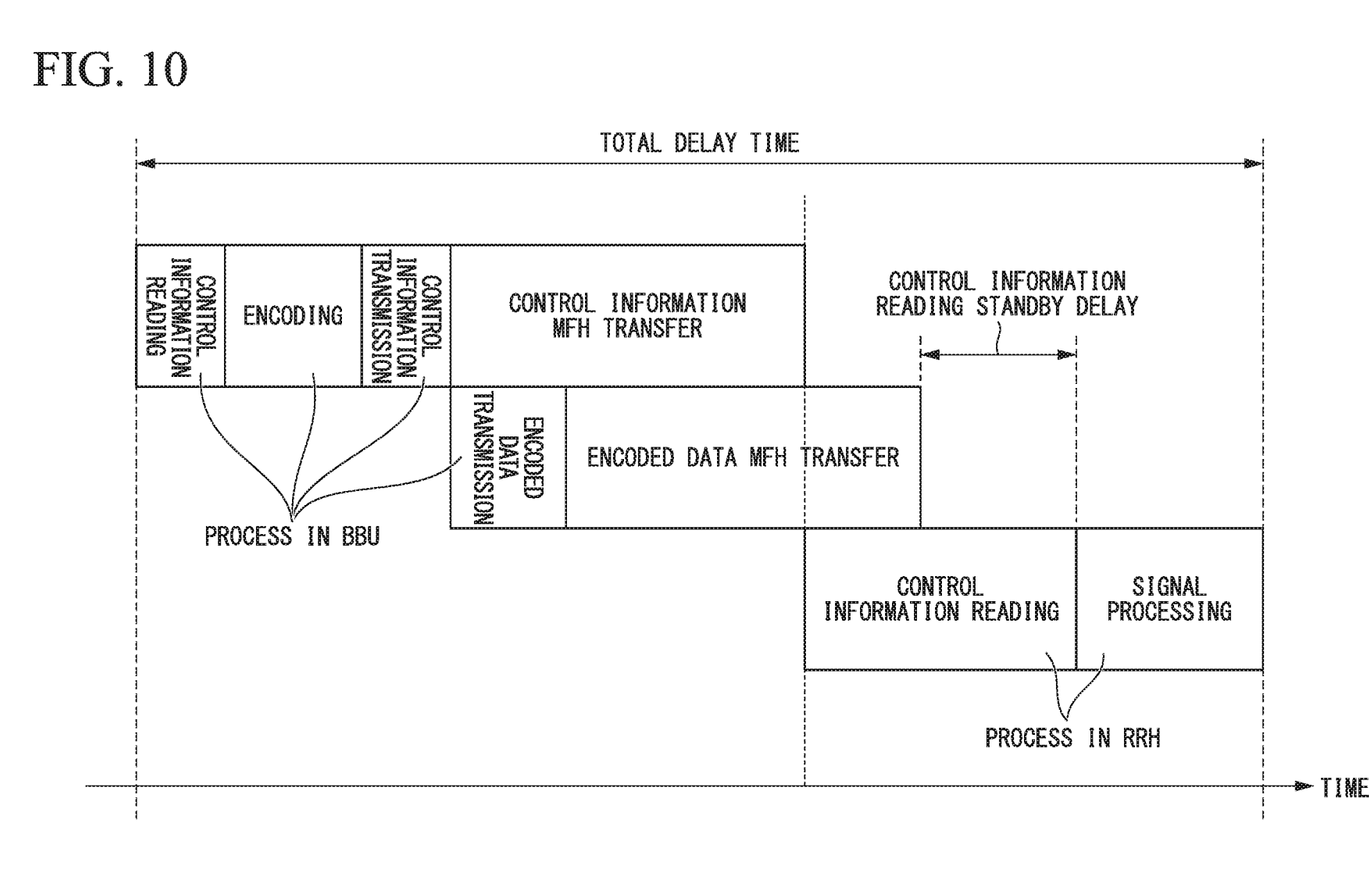
FIG. 10 is a diagram showing a flow of downlink signal transmission in the SPP scheme of the related art.

FIGS. 9 and 10 shows a downlink signal transmission and a flow in an SPP scheme. FIG. 9 is a diagram showing the downlink signal transmission in the SPP scheme. The BBU 93 includes a scheduler 931, an encoding unit 932 and a transmission unit 933. The RRH 94 includes a reception unit 941 and a signal processing unit 942. FIG. 10 is a diagram showing a flow of downlink signal transmission in the SPP scheme. In the downlink signal transmission, the BBU 93 outputs control information generated by the scheduler 931 to the encoding unit 932, and the transmission unit 933 transmits the control information output from the scheduler 931 to the RRH 94 via the MFH. The encoding unit 932 reads the control information output from the scheduler 931 and performs encoding on the data according to the information included in the control information. The encoding unit 932 outputs encoded data obtained by the encoding to the transmission unit 933. The transmission unit 933 transmits the encoded data output from the encoding unit 932 to the RRH 94 via the MFH. In the RRH 94, the reception unit 941 receives the control information and the encoded data, and the signal processing unit 942 performs signal processing on the encoded data according to the information included in the control information.

As shown in FIGS. 8 and 10, since a process in the RRH is performed on the basis of the control information received from the BBU, the process does not start unless the encoding unit or the signal processing unit completes the reading of the control information, and a waiting time occurs. In the downlink signal transmission in the function division scheme described above, there is a problem in that even when the data and the control information has been transmitted to the RRH via the MFH, a process in the physical layer cannot be started unless the reading of the control information is completed in the RRH, and a delay occurs by the waiting time caused by reading of the control information.

CITATION LIST

Non-Patent Literature

Non-Patent Document 1: Yasuhiko Matsunaga, "[Invited Talk] Radio Access Network Architecture Evolution toward 5G," IEICE Tech., Vol. 114, no. 254, RCS 2014-172, pp. 89-94, October 2014

Non-Patent Document 2: Kenji Miyamoto et al., "Proposal of Base Station Function Division Method for Wireless Access in Future," IEICE Tech., Vol. 115, no. 123, CS2015-15, pp. 33-38, 2015 July.

SUMMARY OF INVENTION

Technical Problem

In view of the above circumstances, an object of the present invention is to provide a wireless communication system and a communication method capable of reducing a delay time of downlink signal transmission in a configuration in which functions of a base station are divided for a control device and a communication device.

Solution to Problem

A wireless communication system according to a first aspect of the present invention includes a control device and at least one communication device, wherein the control device includes: a scheduler configured to generate control information for a process of a physical layer in wireless communication between the at least one communication device and a terminal; an encoding unit configured to generate encoded data by performing encoding on data to be transmitted to the terminal on the basis of the control information; and a transmission unit configured to transmit the control information to the at least one communication device when the control information is generated and transmits the encoded data to the at least one communication device when the encoded data is generated, and wherein the communication device includes: a reception unit configured to receive the control information and the encoded data from the control device; and a signal processing unit configured to perform signal processing for transmitting the encoded data received by the reception unit to the terminal on the basis of the control information received by the reception unit.

Further, according to a second aspect of the present invention, in the wireless communication system of the first aspect, wherein the scheduler is further configured to output the control information to the encoding unit and the transmission unit, wherein the encoding unit is further configured to start encoding of the data when the encoding unit reads the control information output from the scheduler, and wherein the signal processing unit is further configured to start signal processing for the encoded data when the signal processing unit reads the control information received by the reception unit.

Further, according to a third aspect of the present invention, in the wireless communication system of the first or second aspect, wherein the at least one communication device comprises a plurality of communication devices connected to the control device, wherein the transmission unit is further configured to transmit the control information and the encoded data to one of the plurality of communication devices that uses the control information and the encoded data.

Further, according to a fourth aspect of the present invention, in the wireless communication system of the first or second aspect, wherein the at least one communication device comprises a plurality of communication devices connected to the control device, wherein the transmission unit is further configured to broadcast the control information and the encoded data to the plurality of communication devices, and wherein the reception unit is further configured to select the control information and the encoded data for a subject device among the control information and the encoded data received from the control device, outputs the selected control information and the selected encoded data to the signal processing unit, and discards the control information and the encoded data for the other communication devices.

Further, a communication method according to a fifth aspect of the present invention is a communication method in a wireless communication system including a control device and at least one communication device, the communication method including: a scheduling step of generating, by the control device, control information for a process of a physical layer in wireless communication between the at least one communication device and a terminal; an encoding step of generating, by the control device, encoded data by performing encoding on data to be transmitted to the terminal on the basis of the control information; a first transmission step of transmitting, by the control device, the control information to the at least one communication device when the control information is generated; a second transmission step of transmitting, by the control device, the encoded data to the at least one communication device when the encoded data is generated; a reception step of receiving, by the at least one communication device, the control information and the encoded data from the control device; and a signal processing step of performing, by the at least one communication device, signal processing for transmitting the encoded data received in the reception step to the terminal on the basis of the control information received in the reception step.

Advantageous Effects of Invention

According to the present invention, it is possible to reduce the delay time of downlink transmission in the configuration in which the functions of the base station are divided for the control device and the communication device.

DESCRIPTION OF EMBODIMENTS

Hereinafter, a wireless communication system and a communication method according to embodiments of the present invention will be described with reference to the drawings. It should be noted that in the following embodiments, the same components denoted by the same reference numerals are assumed to perform the same operation, and duplicated description thereof will be appropriately omitted.

First Embodiment

Figure 1:
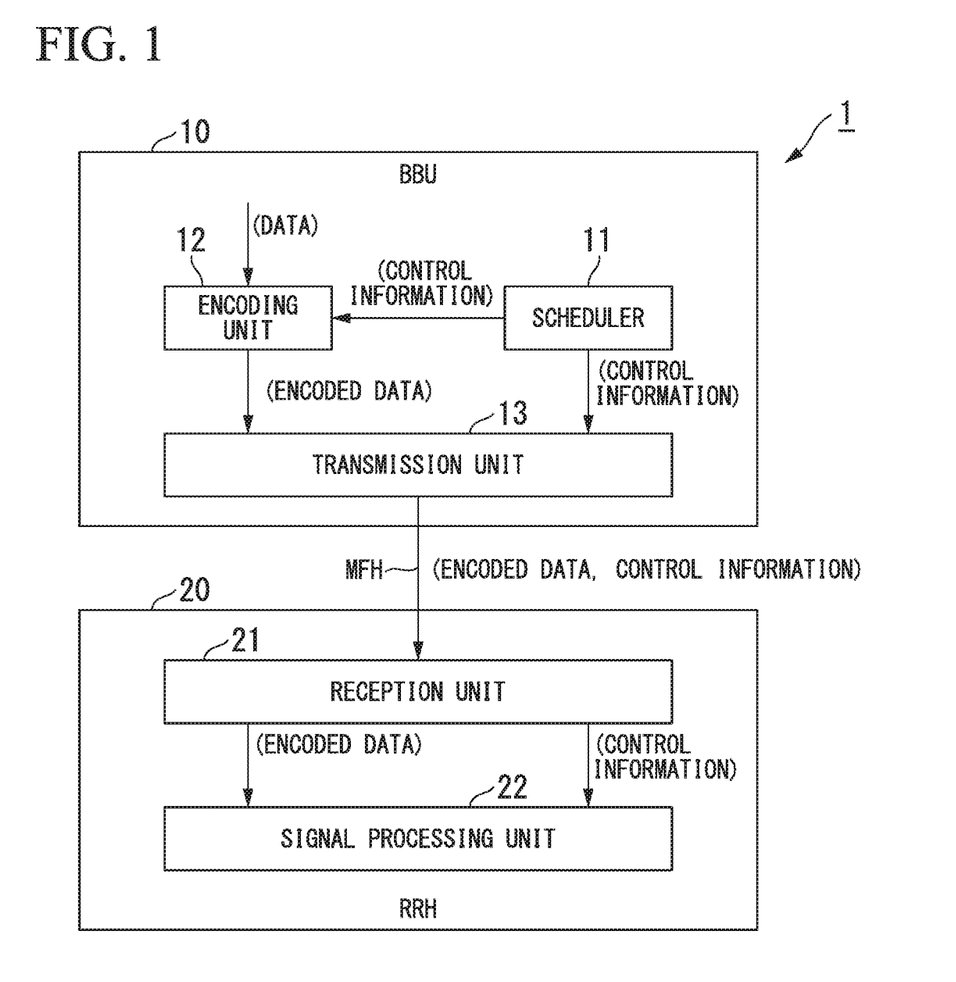
FIG. 1 is a block diagram showing a configuration example of a wireless communication system according to a first embodiment.

FIG. 1 is a block diagram showing a configuration example of a wireless communication system 1 according to a first embodiment. The wireless communication system 1 includes a BBU 10 and an RRH 20, which function as the base station that performs wireless communication with terminals (not shown). The BBU 10 and the RRH 20 are connected via an MFH. The BBU 10, as a control device, includes a scheduler 11, an encoding unit 12 and a transmission unit 13. The RRH 20, as a communication device, includes a reception unit 21 and a signal processing unit 22.

For the BBU 10 and the RRH 20, an SPP scheme is applied as a function division scheme.

In the BBU 10, the scheduler 11 generates control information for a process of a physical layer. The control information includes information indicating a modulation scheme, a coding rate, radio resources (a frequency, a frame, and slots in the frame), transmission power, and the like that the RRH 20 uses in wireless communication with the terminal. The scheduler 11 simultaneously outputs the control information to the encoding unit 12 and the transmission unit 13. The encoding unit 12 encodes data to be transmitted to the terminal on the basis of the control information as soon as the encoding unit 12 reads the control information and determines parameters required for encoding. The encoding unit 12 outputs the encoded data obtained by encoding to the transmission unit 13. The transmission unit 13 transmits the control information output from the scheduler 11 and the encoded data output from the encoding unit 12 to the RRH 20 via the MFH. When the transmission unit 13 acquires the control information output from the scheduler 11, the transmission unit 13 transmits the control information to the RRH 20 regardless of start or completion of the encoding in the encoding unit 12. That is, the transmission unit 13 may transmit the control information to the RRH 20 before the encoding unit 12 finishes the generation of the encoded data.

In the RRH 20, the reception unit 21 receives the control information and the encoded data from the BBU 10 via the MFH. The reception unit 21 outputs the received control information and the received encoded data to the signal processing unit 22. The signal processing unit 22 performs signal processing for transmitting the coded data to the terminal on the basis of the control information as soon as the signal processing unit 22 reads the control information and determines parameters required for signal processing. The signal processing unit 22 transmits a radio signal obtained by signal processing to the terminal. The signal processing performed by the signal processing unit 22 includes, for example, digital-analog conversion, frequency conversion, removal of unnecessary frequency components, amplification and the like.

Figure 2:
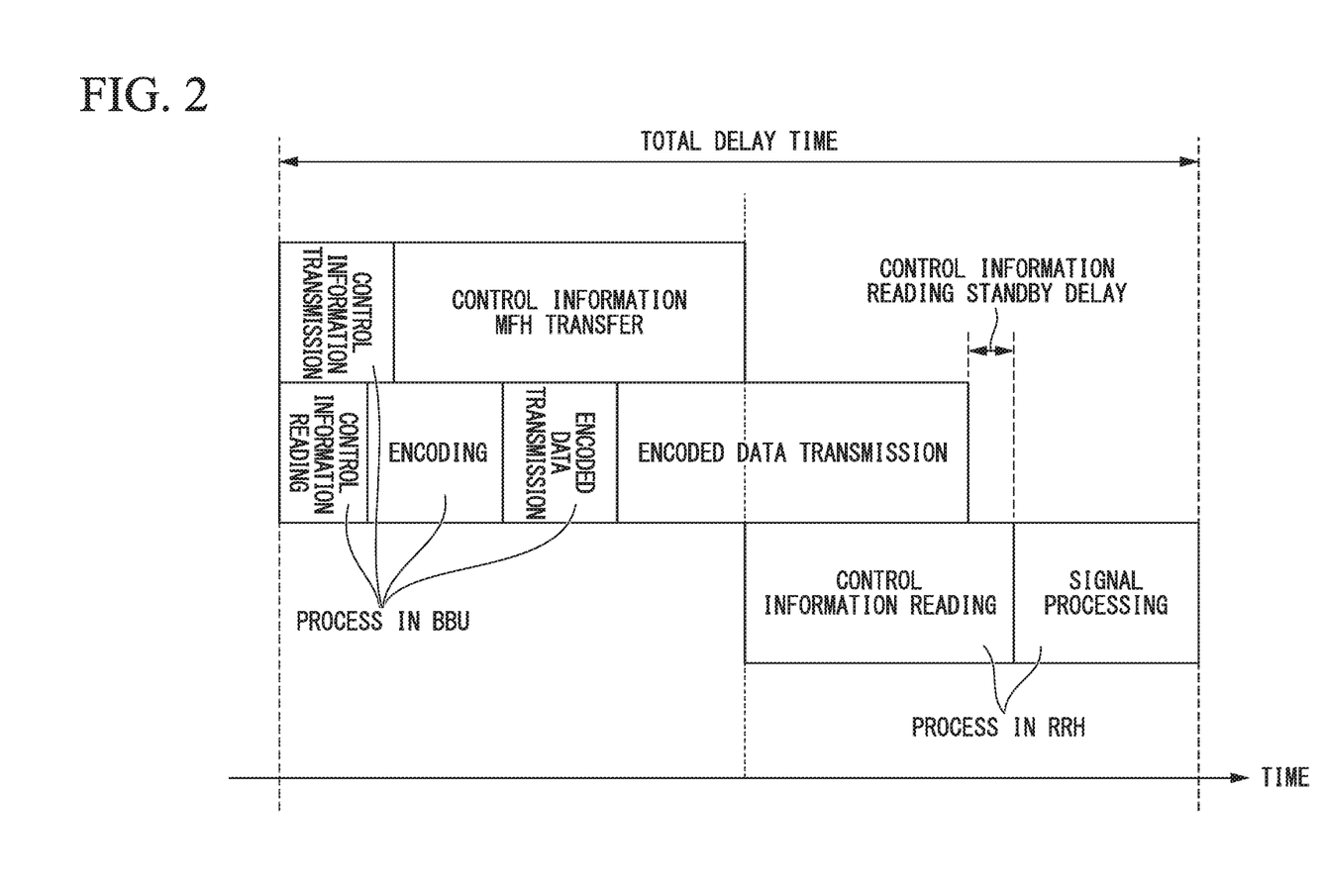
FIG. 2 is a diagram showing a flow of downlink signal transmission in the first embodiment.

FIG. 2 is a diagram showing a flow of downlink signal transmission in the first embodiment. In the BBU 10, the encoding unit 12 reads the control information output from the scheduler 11 and performs encoding based on the control information on the data. In this case, the scheduler 11 outputs the control information to the transmission unit 13 and causes the transmission unit 13 to transmit the control information to the RRH 20 via the MFH. Further, the transmission unit 13 transmits the encoded data obtained through encoding in the encoding unit 12 to the RRH via the MFH.

In the RRH 20, the reception unit 21 receives the control information transmitted via the MFH, and outputs the received control information to the signal processing unit 22. The signal processing unit 22 reads the control information output from the reception unit 21. In addition, the reception unit 21 receives the encoded data transmitted via the MFH, and outputs the received encoded data to the signal processing unit 22. The signal processing unit 22 performs signal processing on the encoded data output from the reception unit 21 as soon as the signal processing unit 22 completes reading the control information.

In the wireless communication system 1 according to the first embodiment, the transmission unit 13 transmits the control information to the RRH 20 while the encoding unit 12 is encoding the data, as shown in FIG. 2. Since the control information is transmitted earlier than the encoded data, the signal processing unit 22 can start reading the control information before the encoded data arrives at the RRH 20. It is seen that by performing the transmission of the control information and the encoding of the data in parallel in the BBU 10, the time shown in FIG. 2 from the arrival of the encoded data at the RRH 20 to the completion of the reading of the control information is shorter than the time of the flow shown in FIGS. 8 and 10. In addition, since the data encoding is performed in the BBU 10, the signal processing unit 22 in the RRH 20 does not have to perform encoding. The processing time in the RRH 20 of the flow shown in FIG. 2 is shorter than the processing time in the RRH of the flow shown in FIG. 8. Accordingly, the time taken from the arrival of the encoded data at the RRH 20 to the completion of the reading of the control information is shortened, and a delay time of the downlink signal transmission can be reduced. Further, it can be seen that a total delay time for the downlink signal transmission is also shorter in the flow of the first embodiment as compared with the flow shown in FIGS. 8 and 10.

Second Embodiment

Figure 3:
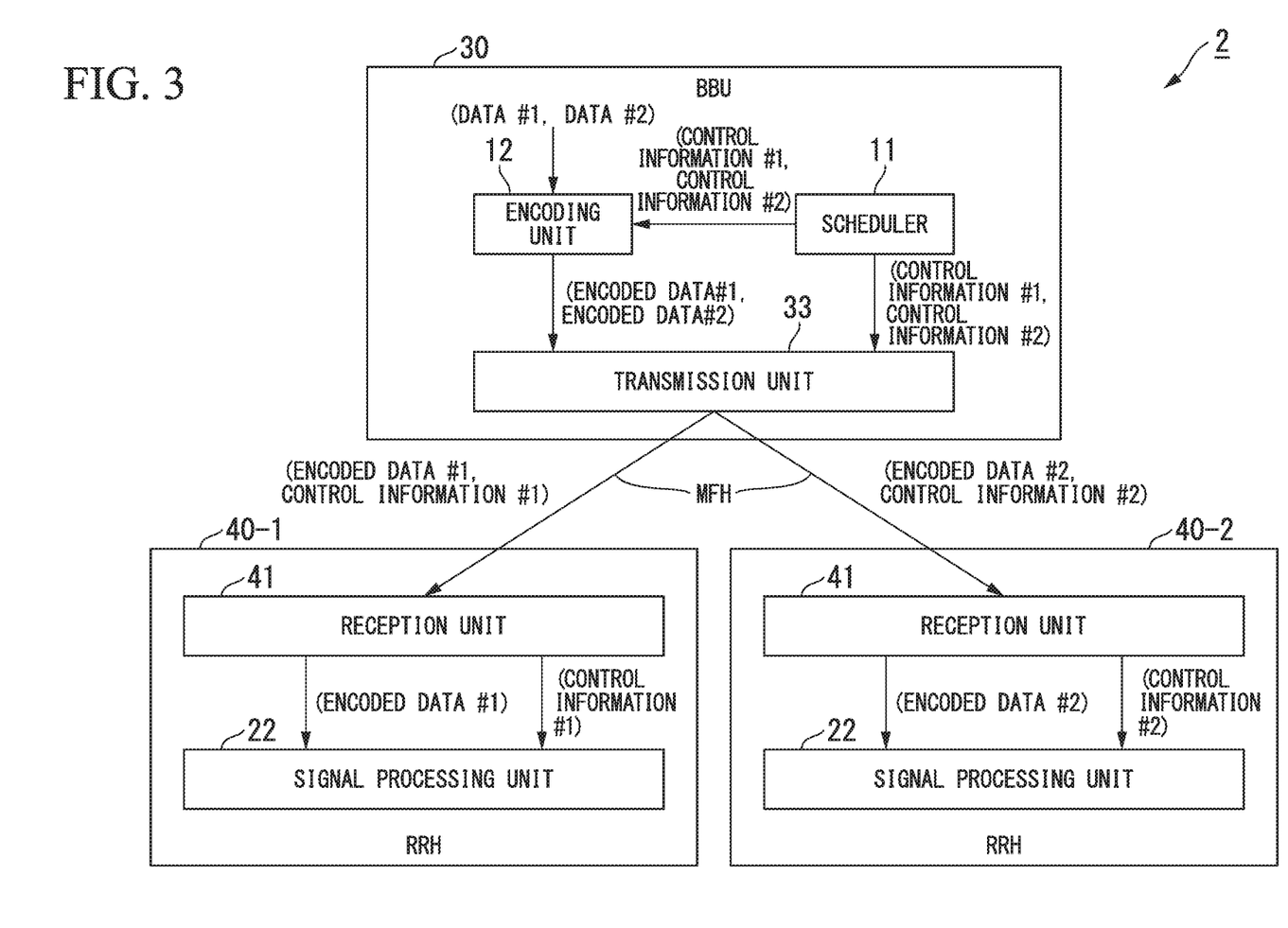
FIG. 3 is a block diagram showing a configuration example of a wireless communication system according to a second embodiment.

In the wireless communication system 1 according to the first embodiment, one BBU 10 and one RRH 20 are connected by the MFH, whereas in the wireless communication system according to a second embodiment, one BBU and two RRHs are connected by the MFH. It should be noted that, although a configuration example in which the two RRHs are connected to the BBU will be described in the second embodiment, three or more RRHs may be connected to the BBU via the MFH.

FIG. 3 is a block diagram showing a configuration example of the wireless communication system 2 in the second embodiment. The wireless communication system 2 includes a BBU 30 and two RRHs 40 (40-1 and 40-2), which function as the base station that performs wireless communication with terminals (not shown). The BBU 30 includes a scheduler 11, an encoding unit 12 and a transmission unit 33. The RRH 40 includes a reception unit 41 and a signal processing unit 22. An SPP scheme is applied to the BBU 30 and the RRH 40 as a function division scheme, as in the wireless communication system 1 of the first embodiment.

The scheduler 11 generates control information #1 and #2 for the RRHs 40-1 and 40-2 and outputs the control information #1 and #2 to the encoding unit 12 and the transmission unit 33. The encoding unit 12 performs encoding on data #1 to be transmitted from the RRH 40-1 to the terminal on the basis of the control information #1 for the RRH 40-1. The encoding unit 12 outputs encoded data #1 obtained by performing encoding on the data #1 to the transmission unit 33. Further, the encoding unit 12 performs encoding on data #2 to be transmitted from the RRH 40-2 to the terminal on the basis of the control information #2 for the RRH 40-2. The encoding unit 12 outputs the encoded data #2 obtained by performing encoding on the data #2 to the transmission unit 33.

The transmission unit 33 transmits the control information #1 output from the scheduler 11 and the encoded data #1 output from the encoding unit 12 to the RRH 40-1 via the MFH. When the control information #1 is output from the scheduler 11, the transmission unit 33 transmits the control information #1 to the RRH 40-1 via the MFH, similarly to the transmission unit 13 in the first embodiment. The transmission unit 33 transmits the encoded data #1 to the RRH 40-1 via the MFH as soon as the encoding is completed by the encoding unit 12. That is, the transmission unit 33 may transmit the control information #1 to the RRH 40-1 before the encoding unit 12 ends the generation of the encoded data #1. The transmission unit 33 transmits the control information #1 and the encoded data #1 to the RRH 40-1 that uses the control information #1 and the encoded data #1 among the RRHs 40 connected to the BBU 30.

The transmission unit 33 transmits the control information #2 output from the scheduler 11 and the encoded data #2 output from the encoding unit 12 to the RRH 40-2 via the MFH. When the control information #2 is output from the scheduler 11, the transmission unit 33 transmits the control information #2 to the RRH 40-2 via the MFH. The transmission unit 33 transmits the encoded data #2 to the RRH 40-2 via the MFH as soon as the encoding is completed by the encoding unit 12. That is, the transmission unit 33 may transmit the control information #2 to the RRH 40-2 before the encoding unit 12 finishes the generation of the encoded data #2. The transmission unit 33 transmits the control information #2 and the encoded data #2 to the RRH 40-2 that uses the control information #2 and the encoded data #2 among the RRHs 40 connected to the BBU 30.

In the RRH 40-1, the reception unit 41 receives the control information #1 and the encoded data #1 transmitted from the BBU 30 to the RRH 40-1. The reception unit 41 outputs the received control information #1 and the received encoded data #1 to the signal processing unit 22. In the RRH 40-1, the signal processing unit 22 starts reading the control information #1 when the reception unit 41 receives the control information #1 from the BBU 30, similarly to the signal processing unit 22 of the RRH 20 of the first embodiment. The signal processing unit 22 starts signal processing on the encoded data #1 output from the reception unit 41 as soon as the signal processing unit 22 completes reading the control information #1. Further, in the RRH 40-2, the reception unit 41 and the signal processing unit 22 operate similarly.

In the wireless communication system 2 according to the second embodiment, the transmission unit 33 transmits the control information #1 and #2 to the RRHs 40-1 and 40-2 while the encoding unit 12 is encoding the data #1 and #2. Since the control information #1 and #2 is transmitted earlier than the encoded data #1 and #2, the signal processing unit 22 can start reading the control information before the encoded data arrives at the RRHs 40-1 and 40-2. By performing the transmission of the control information #1 and #2 and the encoding of the data #1 and #2 in parallel in the BBU 30, the time taken from the arrival of the encoded data #1 and #2 at the RRHs 40-1 and 40-2 to the completion of reading of the control information #1 and #2 is shortened. Accordingly, the time taken from the arrival of encoded data #1 and #2 at the RRHs 40-1 and 40-2 to the completion of reading of the control information #1 and #2 is shortened and a delay time of the downlink signal transmission can be reduced.

Third Embodiment

Figure 4:
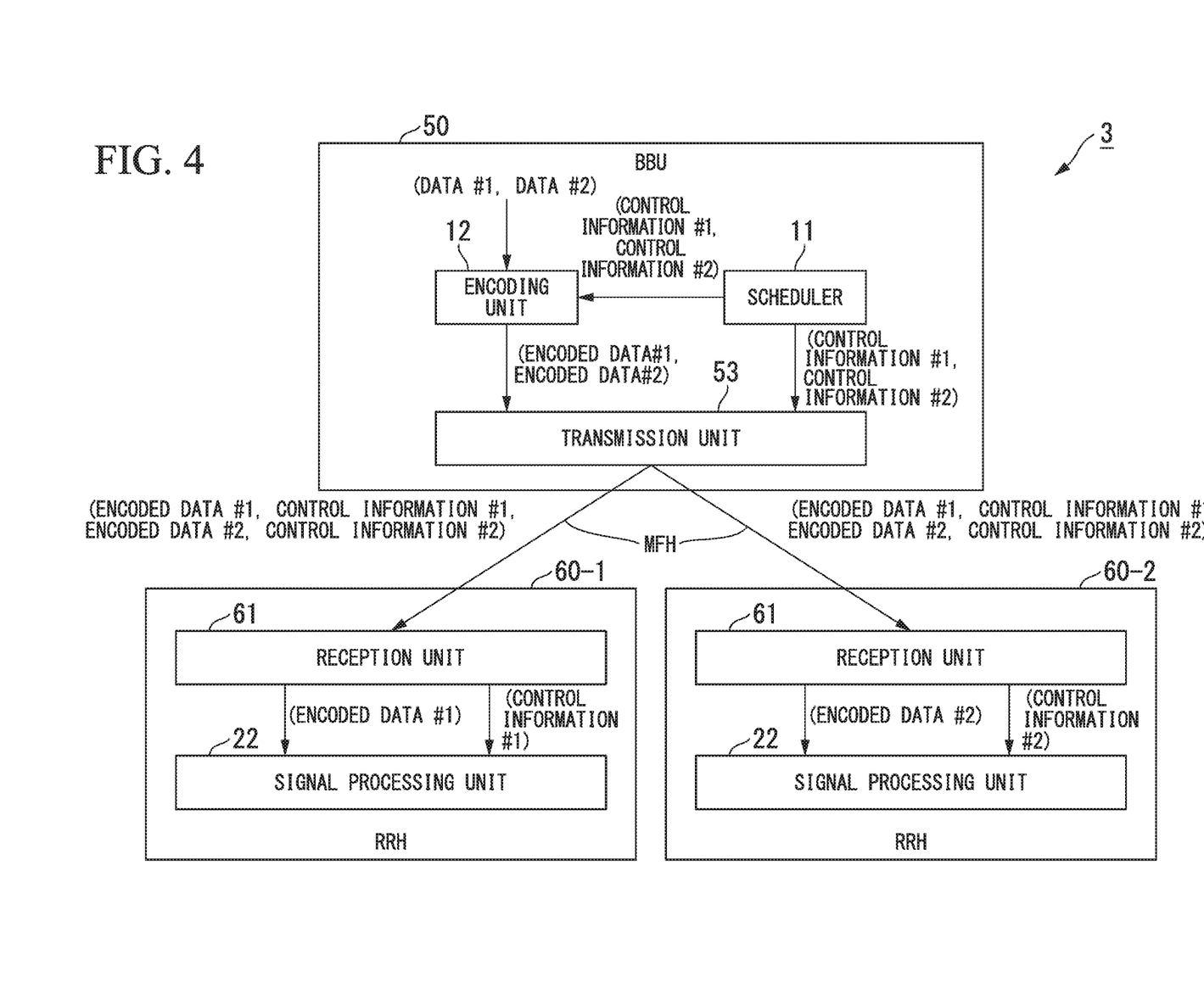
FIG. 4 is a block diagram showing a configuration example of a wireless communication system according to a third embodiment.

FIG. 4 is a block diagram showing a configuration example of a wireless communication system 3 according to a third embodiment. The wireless communication system 3 includes a BBU 50 and two RRHs 60 (60-1 and 60-2), which function as the base station that performs wireless communication with terminals (not shown). The BBU 50 includes a scheduler 11, an encoding unit 12 and a transmission unit 53. The RRH 60 includes a reception unit 61 and a signal processing unit 22. An SPP scheme is applied to the BBU 50 and the RRH 60 as a function division scheme, as in the wireless communication system 1 of the first embodiment. It should be noted that although a configuration example in which the two RRHs 60 are connected to the BBU 50 will be described in the third embodiment, three or more RRHs 60 may be connected to the BBU 50 via the MFH.

The scheduler 11 generates control information #1 and #2 for the RRHs 60-1 and 60-2 and outputs the control information #1 and #2 to the encoding unit 12 and the transmission unit 53. The encoding unit 12 performs encoding on the data #1 to be transmitted from the RRH 60-1 to the terminal on the basis of the control information #1 for the RRH 60-1. The encoding unit 12 outputs encoded data #1 obtained by performing encoding on the data #1 to the transmission unit 53. In addition, the encoding unit 12 performs encoding on data #2 to be transmitted from the RRH 60-2 to the terminal on the basis of the control information #2 for the RRH 60-2. The encoding unit 12 outputs encoded data #2 obtained by performing encoding on the data #2 to the transmission unit 53.

The transmission unit 53 multicasts the control information #1 and #2 output from the scheduler 11 and the encoded data #1 and #2 output from the encoding unit 12 to the RRHs 60-1 and 60-2 via the MFH (broadcast transmission). When the control information #1 and #2 are output from the scheduler 11, the transmission unit 53 transmits the control information #1 and #2 to the RRHs 60-1 and 60-2 via the MFH. The transmission unit 53 transmits the encoded data #1 and #2 to the RRHs 60-1 and 60-2 via the MFH as soon as the encoding is completed by the encoding unit 12. It should be noted that the transmission unit 53 may transmit the control information and the encoded data through broadcast transmission instead of the multicast transmission. That is, the transmission unit 53 may transmit the control information #1 to the RRH 60-1 before the encoding unit 12 ends the generation of the encoded data #1. Further, the transmission unit 53 may transmit the control information #2 to the RRH 60-2 before the encoding unit 12 ends the generation of the encoded data #2.

In the RRH 60-1, the reception unit 61 receives the control information #1 and #2 and the encoded data #1 and #2 transmitted from the BBU 30. The reception unit 61 selects the control information #1 and the encoded data #1 for a subject device (the RRH 60-1) among the received control information #1 and #2 and the received encoded data #1 and #2 and discards the other control information and the other encoded data. The reception unit 61 outputs the selected control information #1 and the selected encoded data #1 to the signal processing unit 22. In the RRH 60-1, the signal processing unit 22 starts reading the control information #1 when the reception unit 61 receives the control information #1 from the BBU 50, similarly to the signal processing unit 22 of the RRH 20 of the first embodiment. The signal processing unit 22 starts signal processing on the encoded data #1 output from the reception unit 61 as soon as the signal processing unit 22 completes reading the control information #1. In the RRH 60-2, the reception unit 41 and the signal processing unit 22 operate similarly.

In the wireless communication system 3 according to the third embodiment, the transmission unit 53 transmits the control information #1 and #2 to the RRHs 60-1 and 60-2 while the encoding unit 12 is encoding the data #1 and #2. Since the control information #1 and #2 are transmitted earlier than the encoded data #1 and #2, the signal processing unit 22 can start reading the control information before the encoded data arrives at the RRHs 60-1 and 60-2. By performing the transmission of the control information #1 and #2 and the encoding of the data #1 and #2 in parallel in the BBU 50, the time taken from arrival of the encoded data #1 and #2 at the RRHs 60-1 and 60-2 to completion of reading of the control information #1 and #2 is shortened. Accordingly, the time taken from the arrival of encoded data #1 and #2 at RRHs 60-1 and 60-2 to the completion of reading of the control information #1 and #2 is shortened and a delay time of the downlink signal transmission can be reduced.

According to the wireless communication system in each of the embodiments described above, the BBU performs the transmission of the control information to the RRH and the encoding of the data in parallel, and the RRH receives the control information and starts reading it. Thus, it is possible to shorten the waiting time until the reading of the control information is completed after the arrival of encoded data at the RRH and to reduce the delay time of the downlink signal transmission.

Although the embodiments of the present invention have been described above in detail with reference to the drawings, the specific configuration is not limited to the embodiments, and designs or the like within the scope not deviating from the gist of the present invention are also included.

INDUSTRIAL APPLICABILITY

The present invention is also applicable to applications in which it is indispensable to reduce the delay time of downlink signal transmission in the configuration in which the functions of the base station are divided using the SPP scheme.

REFERENCE SIGNS LIST

1, 2, 3: Wireless communication system
10, 30, 50, 91, 93: BBU
11, 911, 931: Scheduler
12, 932: Encoding unit
13, 33, 53, 912, 933: Transmission unit
20, 40, 60, 92, 94: RRH
21, 41, 61, 921, 941: Reception unit
22, 923, 942: Signal processing unit

The invention claimed is:

1. A wireless communication system comprising a control device and at least one communication device,
   wherein the control device includes a scheduler, an encoder and a transmitter,
      the scheduler is configured to generate control information for a process of a physical layer in wireless communication between the at least one communication device and a terminal and output the control information to the encoder and the transmitter,
      the encoder is configured to generate encoded data by performing encoding on data to be transmitted to the terminal on a basis of the control information and output the encoded data to the transmitter, and
      the transmitter is configured to transmit the control information to the at least one communication device regardless of a start and a completion of generating the encoded data by the encoder, and the transmitter is further configured to transmit the encoded data to the at least one communication device when the encoded data is generated, and
   wherein the at least one communication device includes:
      a receiver configured to receive the control information and the encoded data from the control device; and
      a signal processor configured to perform signal processing for transmitting the encoded data received by the receiver to the terminal on a basis of the control information received by the receiver.

2. The wireless communication system according to claim 1,
   wherein the encoder is further configured to start encoding of the data when the encoder reads the control information output from the scheduler,
   wherein the signal processor is further configured to start signal processing for the encoded data when the signal processor reads the control information received by the receiver,
   wherein, in the control device, transmitting the control information by the transmitter and encoding the data by the encoder are performed in parallel, and
   wherein, in the at least one communication device, reading the control information by the signal processor and receiving the encoded data by the receiver are performed in parallel.

3. The wireless communication system according to claim 1,
   wherein the at least one communication device comprises a plurality of communication devices connected to the control device, and
   wherein the transmitter is further configured to transmit the control information and the encoded data to one of the plurality of communication devices that uses the control information and the encoded data.

4. The wireless communication system according to claim 1,
   wherein the at least one communication device comprises a plurality of communication devices connected to the control device,
   wherein the transmitter is further configured to broadcast the control information and the encoded data to the plurality of communication devices, and
   wherein the receiver is further configured to select the control information and the encoded data for a subject device among the control information and the encoded data received from the control device, outputs the selected control information and the selected encoded data to the signal processor, and discards the control information and the encoded data for the other communication devices.

5. A communication method in a wireless communication system including a control device and at least one communication device, the communication method comprising:
   a scheduling step of generating, by the control device, control information for a process of a physical layer in wireless communication between the at least one communication device and a terminal;
   an encoding step of generating, by the control device, encoded data by performing encoding on data to be transmitted to the terminal on a basis of the control information;
   a first transmission step of transmitting, by the control device, the control information to the at least one communication device regardless of a start and a completion of the encoding step;
   a first reception step of receiving, by the at least one communication device, the control information from the control device;
   a second transmission step of transmitting, by the control device, the encoded data to the at least one communication device when the encoded data is generated;

a second reception step of receiving, by the at least one communication device, the encoded data from the control device; and a signal processing step of performing, by the at least one communication device, signal processing for transmitting the encoded data received in the reception step to the terminal on a basis of the control information received in the reception step.

\* \* \* \* \*